Figure 1:
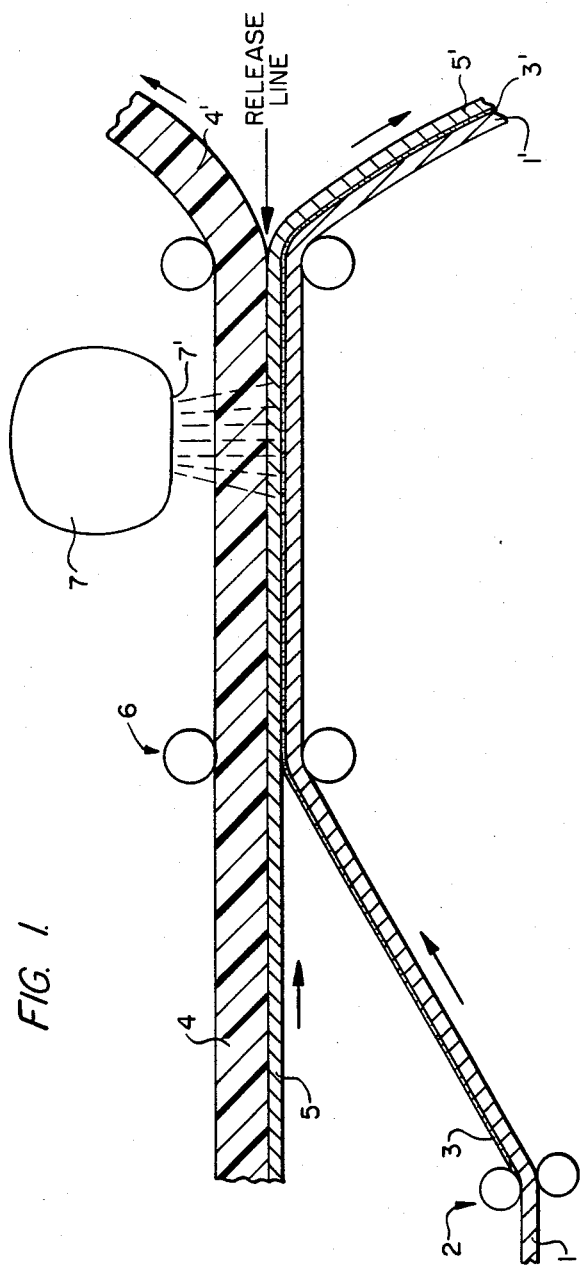

United States Patent [19]

Nablo

[11] Patent Number: 4,490,409

[45] Date of Patent: Dec. 25, 1984

[54] PROCESS AND APPARATUS FOR DECORATING THE SURFACES OF ELECTRON IRRADIATION CURED COATINGS ON RADIATION-SENSITIVE SUBSTRATES

[75] Inventor: Sam Nablo, Lexington, Mass.

[73] Assignee: Energy Sciences, Inc., Woburn, Mass.

[21] Appl. No.: 432,569

[22] Filed: Oct. 4, 1982

[51] Int. Cl.³ .............................................. B05D 3/06
[52] U.S. Cl. ....................................... 427/44; 427/147
[58] Field of Search .......................... 427/44, 54.1, 147

[56] References Cited

U.S. PATENT DOCUMENTS

| | | | |
|---|---|---|---|
| 3,702,412 | 11/1972 | Quintal | 313/299 |
| 3,745,396 | 7/1973 | Quintal et al. | 313/37 |
| 3,769,600 | 10/1973 | Denholm et al. | 328/233 |
| 4,215,170 | 7/1980 | Oliva | 427/147 |
| 4,246,297 | 1/1981 | Nablo et al. | 427/44 |

Primary Examiner—John H. Newsome
Attorney, Agent, or Firm—Rines and Rines, Shapiro and Shapiro

[57] ABSTRACT

A process is disclosed for decorating electron-beam-cured coatings on radiation-sensitive substrates such as paper and the like, with metallized decorative and other layers, by using release layers to which the decorative layers are applied and bonding the same to electron-beam-cured adhesive coatings during curing of the same so that the decorative layers may be transferred to the cured-coated substrate by peeling off the release layer.

11 Claims, 2 Drawing Figures

PROCESS AND APPARATUS FOR DECORATING THE SURFACES OF ELECTRON IRRADIATION CURED COATINGS ON RADIATION-SENSITIVE SUBSTRATES

The present invention relates to processes and apparatus for decorating the surfaces of electron irradiation cured coatings on radiation-sensitive substrates as of paper, fabric, plastic, glass and other thin sheets, being more particularly directed to securing decorative layers to such substrates through the intermediary of electron-curable adhesive coatings cured upon the substrate.

In my earlier U.S. Pat. No. 4,246,297, there is disclosed the lamination between a thin radiation or heat-sensitive substrate, as of paper, fabric or other thin sheet, and a release paper or other layer of an electron-curable coating, as of adhesive properties with the electron energy and doses adjusted with reference to line speeds of the substrate to concentrate the energy in the curing of the coating while obviating degradation of the substrate, and with the peeling away of the release layer from the final product of the substrate with its electron-cured coating(s).

There are occasions, however, where it is desired to decorate the outer surface of the cured coating as with decorative layers, including metallized surfaces or patterns and the like. In accordance with the present invention it has been found possible to interpose a metal or similar decorative layer carried by the release layer, as of plastic, between the same and the electron-curable coating imparting to the coating adhesive properties such that, when cured, it will adhere to the metal or similar decorative layer, and the peeling away of the release layer from the coating cured on the substrate will transfer the metal or other decorative layer secured upon the outer surface of the coating.

An object of the present invention, accordingly, is to provide a new and improved process of and apparatus for electron-beam curing of adhesive or similar coatings upon a paper or similar radiation-sensitive substrate with a decorative layer interposed between the coating and the release paper to enable the decorative layer to become bonded to the cured coating and transfered from the release layer when it is peeled away after the curing.

A further object is to provide an electron-beam curing and layer transfer process of more general utility as well.

Other and further objects will be explained hereinafter and are more particularly delineated in the appended claims.

In summary, however, from one of its aspects the invention embraces a process for the substantially uniform electron beam curing of an adhesive coating disposed within an assembly having an electron permeable release layer that carries a mechanically adhered decorative layer to which is applied the coating and that is in turn applied to a radiation-sensitive substrate, comprising, passing the coated release-layer-decorative layer and substrate assembly along a predetermined path; pressing the assembly together; accelerating electron strip beam radiation through an electron-permeable window adjacent to a predetermined region of said path and causing the accelerated strip beam radiation to impinge upon said region over the entire elongated cross-sectional area of the beam simultaneously and substantially uniformly perpendicular to said path; maintaining substantially the entire impinging strip beam radiation at said region at a predetermined energy level selected within energy limits of from substantially 80 to 180 KeV; adjusting the dose delivered by the beam at that predetermined energy level to the pressed-together coated release-layer-decorative layer and substrate assembly at said region to a predetermined value within dose limits of from substantially 0.5 to several megarads; the energy and dose being matched to the thickness and materials of the coated release-layer-decorative layer and substrate in order to concentrate the principal amount of the electron strip beam energy substantially uniformly in said coating and to cure the coating while insuring minimal energy reaction with the release layer, decorative layer and substrate; the decorative layer being attached to the inner surface of the release layer but susceptible of being stripped therefrom by a predetermined stripping force; the adhesive coating juxtaposed upon the decorative layer between the same and the substrate having sufficient viscosity to stick to the decorative layer and, upon the electron-beam curing of the adhesive layer, bonding to the decorative layer with an adhering force equal to or greater than said predetermined stripping force; and peeling the release layer from the substrate with its cured coating and adhered transfered decorative layer. Preferred and best mode embodiments are later detailed.

Figure 2:
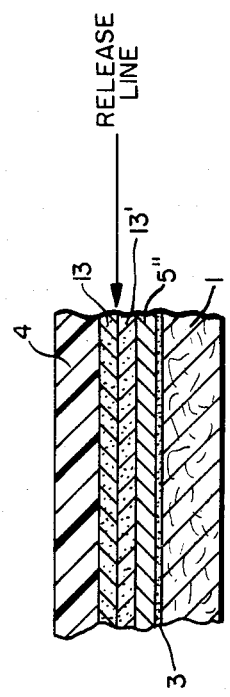

The invention will now be described in connection with the accompanying drawing, FIG. 1 of which is a schematic side elevation of a system employing the process of the invention; and FIG. 2 is a similar but fragmentary view, upon an enlarged scale, of a modification.

Referring to FIG. 1, a radiation-sensitive substrate as before discussed, as of paper, is shown in web form 1, being fed to an electron-beam curable coating station 2, as of gravure or other rolls, for receiving the coatings, such as an adhesive 3. Simultaneously, a release layer web, preferably non-moisture bearing, as of polyester of polypropylene plastic layers or films or the like 4 (such as Mylar), is fed in the same general direction with an attached decorative layer 5 on its inner surface, such as a mechanically attached vapor-deposited metallized decorative layer, requiring the before-mentioned non-moisture aspect in the in-vacuum vapor-deposition process, in sheet or pattern form. The coated paper 1-3 and release layer with decorative layer 4-5 are pressed together at station 6 to provide an assembly where the release paper 4 now carries the electron-beam curable adhesive layer 3 stuck to the decorative layer 5 and also carried by the paper substrate 1. The pressed-together assembly is passed under an electron-beam irradiation station 7, preferably of the type described in said U.S. Pat. No. 4,246,297 and in U.S. Pat. Nos. 3,702,412, 3,745,396 and 3,769,600. Such electron processors accelerate a strip beam of low power energetic electrons (say 80 to 180 KeV) through an electron-permeable elongated window 7' simultaneously to impinge a uniform strip of elongated cross-sectional area electrons (into the plane of FIG. 1, transversely across the webs 1-4) perpendicularly upon the assembly 4-5-3-1. By adjusting the beam energy and dose and distance between the window and webs as described in said U.S. Pat. No. 4,246,297, within dose limits from substantially 0.5 to several megarads, the energy and dose can be substantially matched to the thicknesses of the materials of the adhesive-coated-decorated-layer-release paper sub-assembly 3-5-4 to the right of the lamination or pressure rolls 6, and of the substrate 1 to concentrate the principal energy substantially uniformly in the adhesive coating 3 while insuring minimal energy reaction with the release layer and substrate.

In accordance with the discovery underlying the present invention, with appropriate viscosity ranges for the electron-beam curable adhesive coating 3, during cure under the radiation processor 7, it has been found that the decorative metallized layer 5 can become sufficiently bonded and permanently adhered to the cured coating 3 that when the release layer 4 is peeled away at 4', along the release line so-labelled, a force equal to or greater than that required to strip the deposited metallized decorative layer 5 from the release layer 4 is exerted upon layer 5 by cured coating 3, such that a cured coating adhered to the paper substrate 1 is produced with a transferred decorative metallized layer as the finished product 1'-3'-5'.

Suitable adhesive coatings for these purposes are, for example, the Hughson Chemicals Co. CD4171-63, with a viscosity range of from about 300 to 8000 centipoise. The metallized decorative layer 5 may be of thickness of the order of 2-6 ohms/square (1200 to 400 Angstroms) vacuum deposited on a coated Mylar film or layer 4 of about 25 microns thickness. Under such circumstances, the stripping force to remove the deposited layer 5 from the release layer 4 is of the order of substantially 500 grams/inch, more or less; which, for the electron-beam curable adhesives above mentioned, in thicknesses of about 5-10 grams/square meter on the paper substrate 1 (of thicknesses of about 90 grams/square inch meter), is less than the adhesion force of the cured adhesive coating 3 bonded to the metallized layer 5, enabling stripping from the release layer 4 in a reliable manner.

As a typical example, with a Newton Falls C2S type paper in web form, about 18 inches across the web and travelling at a line speed of about 50 to 250 feet/minute, a polyurethane type adhesive coating of thickness of 5 grams/square meter (2 to 20 grams/square meter being particularly useful), a Mylar release film with a vapor-deposited aluminum metal layer 5 of about 40 nanometers in thickness (30-300 nanometers being a useful range), has been successfully assembled, cured and has produced a highly satisfactory product 1'-3'-5' with the Electrocurtain® processor of Energy Sciences Inc. operated with the window 7' about 2 cm. from the release layer 4 and at a voltage of 200 KV and a dose of 3.0 megarads.

While the adhesive coating 3 is ultimately carried by the decorated release layer 4-5 beyond the lamination station 6 to the radiation processor 7, the coating 3 could have been applied directly to the decorative layer 5 instead of being applied thereto after deposition on the paper substrate 1. If desired, moreover, the metal or other decorative layer 5 may be attached to the inner surface of the release layer 4 other than by vapor-deposition. The decorative metal or other layer 5, moreover, may then be provided with a clear or other prime or protective coating on its surface, facing the inner surface of the release layer. For example, in FIG. 2, a release coat adhesive 13 is shown used to attach a thin metal or other decorative layer or pattern 5"; and prime coat coating 13' may also be used, again deposited on the inner surface of the release film or layer 4. The assembly of the release layer 4 with its release coating 13 (and perhaps prime coating 13') attaching the decorative layer 5", again laminated with the adhesive coating 3 and substrate 1, is then passed to the curing station 7, resulting in curing of the coatings such that the release paper and its cured release coat 13 peel away, leaving the decorative metal (or other) layer 5" secured as a decoration bonded to the cured adhesive coating 3, and, if desired, with a cured protective prime coating 13' thereover. Suitable electron-beam curable coatings for such an assembly are adhesive coating 3-Mobil 187A; release coating 13-Mobil 145; prime coating 13'-Mobil 173.

Further modifications, including other suitable materials for the substrate, decorative and release layers, and other geometrics of layers and electron beams will readily suggest themselves to those skilled in the art and such are considered to fall within the spirit and scope of the invention as defined in the appended claims.

What is claimed is:

1. A continuous in-line process for the substantially uniform electron beam curing of an adhesive coating disposed within an assembly having an electron permeable release layer that carries a mechanically adhered decorative layer to which is applied the coating and that is in turn applied to a radiation-sensitive substrate, comprising, continuously passing the coated release-layer-decorative layer and substrate assembly along a predetermined path at a predetermined line speed; pressing the assembly together; accelerating electron strip beam radiation through an electron-permeable window adjacent to a predetermined region of said path and causing the accelerated strip beam radiation to impinge upon said region over the entire elongated cross-sectional area of the beam simultaneously and substantially uniformly perpendicular to said path; maintaining substantially the entire impinging strip beam radiation at said region at a predetermined energy level selected within energy limits of from substantially 80 to 180 KeV; adjusting the dose delivered by the beam at the predetermined energy level to the pressed-together coated release layer-decorative layer and substrate assembly at said region to a predetermined value within dose limits of from substantially 0.5 to several megarads; the energy and dose being matched to the thickness and materials of the coated release layer-decorative layer and substrate in order to concentrate the principal amount of the electron strip beam energy substantially uniformly in said coating and to cure the coating while insuring minimal energy reaction with the release layer, decorative layer and substrate; the decorative layer being attached to one surface of the release layer but susceptible of being stripped therefrom by a predetermined stripping force; the adhesive coating juxtaposed upon the decorative layer between the same and the substrate having sufficient viscosity to stick to the decorative layer and, upon the electron-beam curing of the adhesive layer, bonding to the decorative layer with an adhering force equal to or greater than said predetermined stripping force; the viscosity of the adhesive and the line speed being chosen with regard for the time between the pressing of the assembly together and the curing of the adhesive coating such that the decorative layer remains substantially entirely on the adjacent surface of the adhesive coating; and, as said assembly is continuously moved along said path, peeling the release layer from the substrate with its cured coating and adhered transfered decorative layer.

2. A process as claimed in claim 1 and in which said decorative layer is a metallized layer or layer pattern deposited upon the release layer, and removable therefrom upon application of at least said predetermined stripping force exerted by the peeling of the release layer from the cured adhesive coating cured to the substrate.

3. A process as claimed in claim 2 and in which said release layer is of plastic sheet such as Mylar, and said substrate is of paper.

4. A continuous in-line process for the substantially uniform electron beam curing of an adhesive coating upon a radiation-sensitive substrate with a decorative layer transferred from a release layer and adhered to the cured coating, comprising, attaching a decorative layer to one surface of a release layer with the decorative layer susceptible of being stripped therefrom by a predetermined stripping force; forming an assembly of the release-layer-decorative layer, a substrate, and an electron-beam-curable adhesive coating between the decorative layer and the substrate; said assembly being moved continuously at a predetermined line speed along a predetermined path; adjusting the viscosity of the adhesive coating to stick to the decorative layer and, upon the electron-beam curing of the adhesive layer, bonding to the decorative layer with an adhering force equal to or greater than said predetermined stripping force; pressing the assembly together; impinging electron beam radiation upon the pressed-together assembly comprising the substrate with the adhesive coating and decorative layer carried by the release layer and adjusting the beam to concentrate the principal energy within the coating to cure the same with minimal reaction upon the release layer, decorative layer and substrate of the assembly; the viscosity of the adhesive and the line speed being chosen with regard for the time between the pressing of the assembly together and the curing of the adhesive coating such that the decorative layer remains substantially entirely on the adjacent surface of the adhesive coating; and, as said assembly is continuously moved along said path, peeling the release layer from the substrate with its cured coating and adhered transfered decorative layer.

5. A process as claimed in claim 4 and in which said decorative layer is a metallized layer or layer pattern deposited upon the release layer, and removable therefrom upon application of at least said predetermined stripping force exerted by the peeling of the release layer from the cured adhesive coating cured to the substrate.

6. A process as claimed in claim 5 and in which said release layer is of plastic sheet such as Mylar, and said substrate of paper.

7. A process as claimed in claim 6 and in which said predetermined stripping froce is of the order of at least substantially 500 grams/inch, and said viscosity is in the range of substantially 300 to 8000 centipoise.

8. A process as claimed in claim 6 and in which the thickness of the metallized decorative layer is of the order of about 30–300 nanometers, and the thickness of the adhesive coating is of the order of about 2 to 20 grams/square inch.

9. A process as claimed in claim 4 and in which the decorative layer is attached to the release layer by one or more further coatings.

10. A process as claimed in claim 9 and in which said further coatings comprise a release coating adjacent the release layer.

11. A process as claimed in claim 10 and in which a prime coating is also provided between the release coating and the decorative layer.

* * * * *